(12) United States Patent
Peterson

(10) Patent No.: US 11,548,005 B2
(45) Date of Patent: *Jan. 10, 2023

(54) MICROPLATE AND METHODS FOR MAKING THE SAME

(71) Applicant: DOUGLAS SCIENTIFIC, LLC, Alexandria, MN (US)

(72) Inventor: Bruce Malcolm Peterson, Alexandria, MN (US)

(73) Assignee: DOUGLAS SCIENTIFIC, LLC, Alexandria, MN (US)

(*) Notice: Subject to any disclaimer, the term of this patent is extended or adjusted under 35 U.S.C. 154(b) by 575 days.

This patent is subject to a terminal disclaimer.

(21) Appl. No.: 16/242,884

(22) Filed: Jan. 8, 2019

(65) Prior Publication Data
US 2019/0143320 A1   May 16, 2019

Related U.S. Application Data

(63) Continuation of application No. 13/003,779, filed as application No. PCT/US2009/050639 on Jul. 15, 2009, now Pat. No. 10,173,218.

(60) Provisional application No. 61/081,435, filed on Jul. 17, 2008.

(51) Int. Cl.
| | | |
|---|---|---|
| *B01L 3/00* | (2006.01) | |
| *B29C 51/00* | (2006.01) | |
| *B29C 65/18* | (2006.01) | |
| *B29C 65/00* | (2006.01) | |
| *B29L 31/00* | (2006.01) | |

(52) U.S. Cl.
CPC .......... *B01L 3/50851* (2013.01); *B29C 51/00* (2013.01); *B29C 65/18* (2013.01); *B29C 66/112* (2013.01); *B29C 66/131* (2013.01); *B29C 66/5346* (2013.01); *B29C 66/61* (2013.01); *B01L 2200/025* (2013.01); *B29L 2031/712* (2013.01); *Y10T 156/1062* (2015.01)

(58) Field of Classification Search
CPC ......... B01L 3/50851; B01L 2300/0829; B01L 2300/12
USPC ........................................ 422/552, 553, 551
See application file for complete search history.

(56) References Cited

U.S. PATENT DOCUMENTS

| | | |
|---|---|---|
| 4,599,314 A | 7/1986 | Shami |
| 4,725,388 A | 2/1988 | Nelson |
| 4,734,192 A * | 3/1988 | Champion .............. B01D 61/18 210/321.72 |
| 5,096,672 A | 3/1992 | Tervamaki |
| 5,319,436 A | 6/1994 | Manns |
| 5,514,343 A | 5/1996 | Verwohlt |
| 6,015,534 A | 1/2000 | Atwood |
| 6,051,191 A | 4/2000 | Ireland |
| 6,340,589 B1 | 1/2002 | Turner |
| 6,514,750 B2 | 2/2003 | Bordenkircher |
| 6,528,302 B2 | 3/2003 | Turner |
| 6,537,752 B1 | 3/2003 | Astle |
| 6,632,653 B1 | 10/2003 | Astle |
| 6,878,345 B1 | 4/2005 | Astle |
| 2003/0032046 A1 | 2/2003 | Duffy |
| 2005/0047971 A1 | 3/2005 | Clements |
| 2010/0303689 A1 | 12/2010 | Peterson |

FOREIGN PATENT DOCUMENTS

| | | |
|---|---|---|
| DE | 4217868 A1 | 12/1993 |
| DE | 19739119 A1 | 3/1999 |
| WO | 1998/31466 A1 | 7/1998 |
| WO | 2001/07160 A2 | 2/2001 |
| WO | 2003/004166 A1 | 1/2003 |
| WO | 2009/094495 A1 | 7/2009 |

OTHER PUBLICATIONS

International Search Report for International Application No. PCT/US2009/050639, dated Feb. 8, 2010, 3 pages.
Written Opinion for International Application No. PCT/US2009/050639, dated Feb. 8, 2010, 5 pages.

* cited by examiner

*Primary Examiner* — Natalia Levkovich
(74) *Attorney, Agent, or Firm* — Greenberg Traurig, LLP

(57) ABSTRACT

A microplate (10) includes a carrier (12) having a plate (20) and an annular perimeter wall (30) to define a recess (34). An array of holes (26) extends through the plate (20). A tape piece (16), die cut from a flexible tape (60) includes an array of wells (54) each extending through and having an opening (56) extending into the well (54). The array of wells (54) has a number and locations corresponding to the array of holes (26). The openings (56) have sizes corresponding to the holes (26). An upper surface (50) of the tape piece (16) is abutted with and bonded to the bottom face (24) of the plate (20) with the openings (56) corresponding to the array of holes (26). The slideable receipt of an annular outer periphery (58) of the tape piece (16) insures that the array of wells (54) are aligned to correspond to the array of holes (26) as die cutting of tape piece (16) insures that the array of wells (54) are at consistent positions relative to the annular outer periphery (58).

3 Claims, 4 Drawing Sheets

MICROPLATE AND METHODS FOR MAKING THE SAME

RELATED APPLICATIONS

This application is a continuation application of U.S. application Ser. No. 13/003,779, filed Jan. 12, 2011, which is a 371 National Stage application of PCT/US2009/050639, filed Jul. 15, 2009, which claims the benefit of and priority to U.S. Provisional Application No. 61/081,435, filed on Jul. 17, 2008, the entire contents of which are incorporated herein by reference.

BACKGROUND

The present invention relates to a microplate and, more particularly, to a microplate having an array of wells for receiving samples. The present invention also relates to methods for making the microplate.

Trays or microplates with an array of wells are commonly utilized for sample storage and retrieval or for qualitative and quantitative assays in various research and diagnostic procedures. These trays or microplates are generally formed of solid material with molded wells and generally have differing patterns in the array of wells including 8×12 wells with a spacing of 9 mm between centers, 16×24 wells with a spacing of 4.5 mm between centers, and 32×48 wells with a spacing of 2.25 mm between centers. It is well known that different uses of microplates make different demands on the overall form and structure of the microplate. Specifically, the microplates require a specific combination of physical and material properties including rigidity, strength, and straightness required for robotic manipulation; flatness of well arrays required for accurate and reliable liquid sample handling; physical and dimensional stability and integrity during and following exposure to high temperatures; and thin-walled sample wells required for optimal thermal transfer to samples received in the wells. Conventional microplates suffer from various disadvantages. For example, a new mold is required when the size or the pattern of the wells is changed. Furthermore, conventional microplates can not meet the different demands.

U.S. Pat. No. 6,632,653 to Astle discloses a method for performing a reagent protocol using polymerase chain reaction. U.S. Pat. No. 6,878,345 to Astle discloses a method for performing biological assays. In both Astle patents, a carrier tape is utilized to avoid the problems of freeze-thaw cycle. The carrier tape includes a substrate web formed with a plurality of reagent receiving wells and is indexed by human or machine readable indicia for pattern identification. However, the carrier tape can not be directly handled by the automated equipment set up for solid materials conventional trays or microplates.

Thin-well microplates meeting different demands and methods for making such thin-well microplates have been proposed, and examples of which have been disclosed in U.S. Pat. Nos. 6,340,589 and 6,528,302 to Turner et al. Sample wells are joined with the top surface of a skirt and frame portion and/or the peripheries of the holes in the skirt and frame portion, and the upper ends of the sample wells extend beyond the top surface of the skirt and frame portion. When the thin-wall microplate is subjected to a freeze-thaw cycle or other thermal procedures for heating or cooling the samples in the sample wells during tests, the heat transfer rate is not satisfactory, for the upper ends of the sample wells are blocked by the skirt and frame portion and, thus, are not in direct contact with the heating or cooling media. Furthermore, varying temperature zones exist throughout the sample wells that extend through the holes of the skirt and frame portion such that the thermal mass of the skirt and frame portion has adverse affect on the sample wells during heat transfer, for there will be a varying temperature gradient moving down the well due to the thermal mass of the skirt and frame portion.

Thus, a need exists for a microplate that overcomes the deficiencies and problems experienced by prior microplates, that provides satisfactory heat transfer effect for the samples received in the wells and that can be manufactured easily.

BRIEF SUMMARY OF THE INVENTION

The present invention solves this need and other problems in the field of microplates by providing, in a preferred form, a novel microplate and its method of manufacture. The microplate includes a carrier formed of a rigid material. The carrier includes a plate having a top face and a bottom face spaced from the top face in a direction. The plate includes an array of holes extending from the top face through the bottom face. A tape piece is made of an embossable, 3hermos-conductive, and low mass material and includes an upper surface and a lower surface spaced from the upper surface in the direction. The tape piece further includes an array of wells each extending in the direction away from the upper surface and each having an opening extending from the upper surface into the well. The array of wells of the tape piece has a number and locations corresponding to the array of holes of the plate. The openings of the array of wells of the tape piece have sizes corresponding to the array of holes of the plate. The upper surface of the tape piece is abutted with and bonded to the bottom face of the plate with the openings of the array of wells of the tape piece corresponding to the array of holes of the plate.

In the most preferred form, the plate has a thickness between the top and bottom faces in the direction and sufficient to resist flexing. The carrier further includes an annular perimeter wall extending from the plate and extending in a direction perpendicular to the top and bottom faces. The annular perimeter wall includes an annular inner face. A recess is defined by the annular inner face and the bottom face of the carrier. A thickness of the tape piece between the upper and lower surfaces in the direction provides flexibility allowing rolling. The upper surface of the tape piece can be bonded to the bottom face of the plate by a two-sided tape, 3hermos-bonding or adhesive. The tape piece includes an annular outer periphery extending between and perpendicular to the upper and lower surfaces. The annular outer periphery of the tape piece has a size corresponding to and slideably received in the recess of the carrier such that the openings of the array of wells of the tape piece are aligned with the array of holes of the plate when the annular outer periphery of the tape piece is slideably received in the recess of the carrier and abuts the annular inner face.

In the most preferred example, the tape piece is obtained by die cutting a flexible tape moving a cutting die relative to an anvil spaced from the cutting die in the direction. The flexible tape has a plurality of tractor feed holes formed along two parallel, spaced, longitudinal edges thereof and which are used to feed the flexible tape. The flexible tape further has a plurality of arrays of wells spaced from one another along a longitudinal axis of the flexible tape perpendicular to the direction and intermediate the tractor feed holes formed along the two parallel, spaced, longitudinal edges. In a preferred form, the anvil includes an array of apertures having a number and locations corresponding to and receiving the array of wells of the tape piece as the cutting die is moved against the flexible tape.

Furthermore, in a preferred aspect of the present invention, the tape piece and the carrier are abutted together and bonded between top and bottom pressing jaws. The bottom pressing jaw includes an array of apertures having a number and locations corresponding to the array of wells of the tape piece. The top pressing jaw is moved relative to the bottom pressing jaw in the direction to sandwich the upper surface of the tape piece to the bottom face of the plate with the openings of the array of wells of the tape piece aligned with the array of holes of the plate and with the array of wells of the tape piece corresponding to the array of apertures of the bottom pressing jaw.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
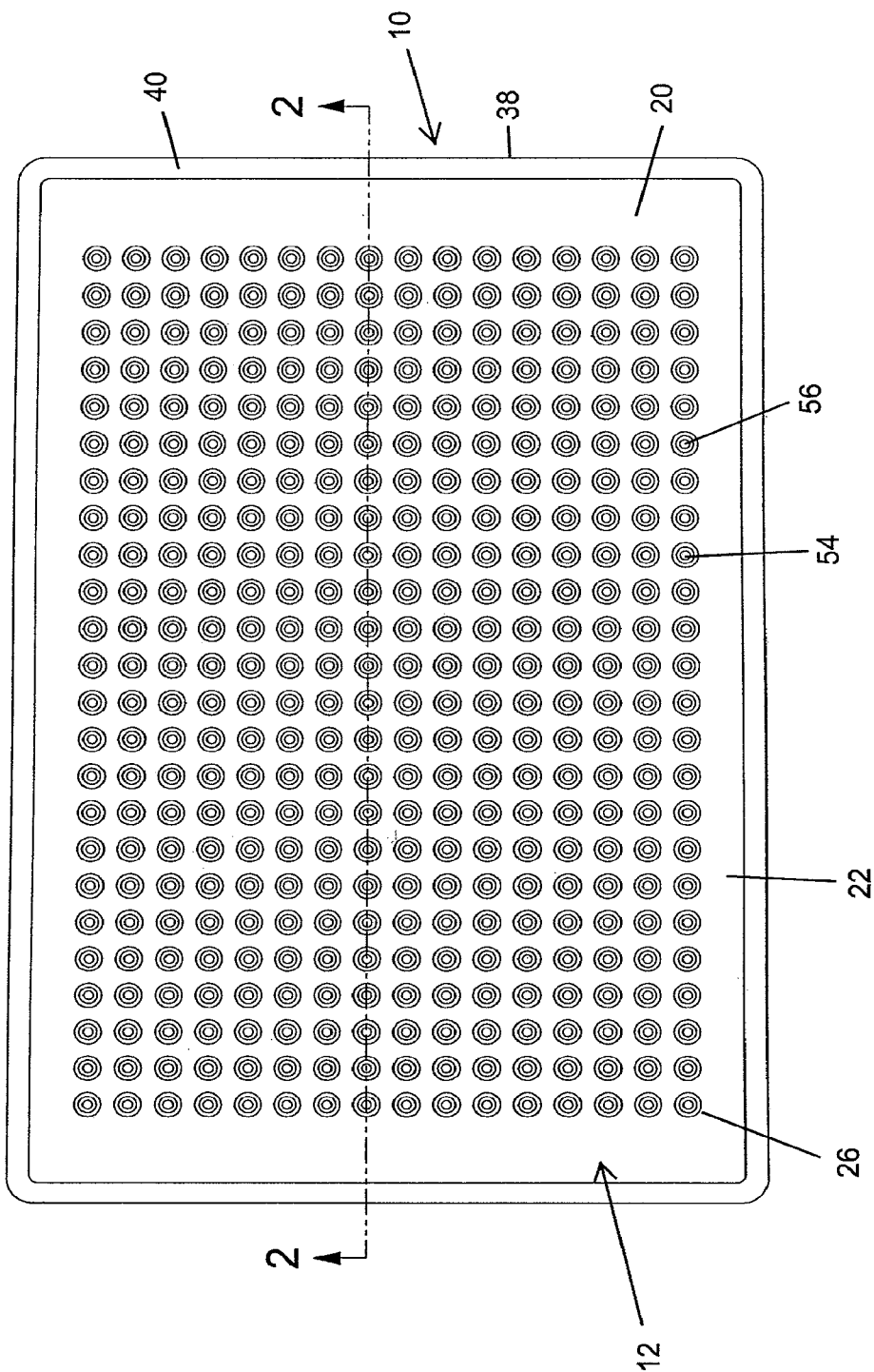
FIG. 1 shows a diagrammatic top view of a microplate according to the preferred teachings of the present invention.
Figure 2:
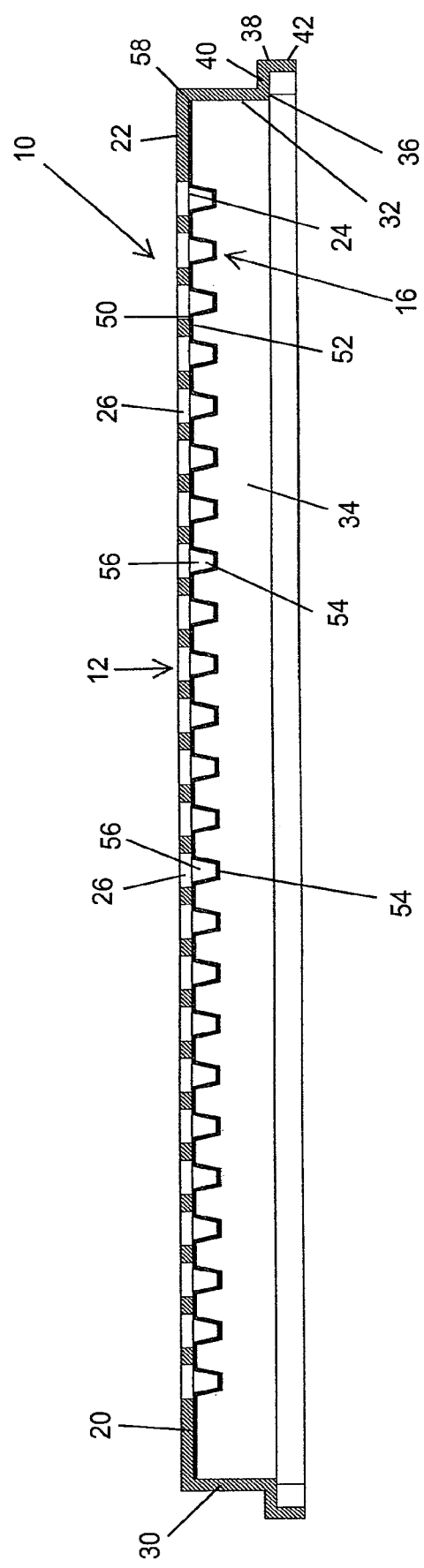
FIG. 2 shows an enlarged, cross-sectional view of the microplate of FIG. 1 according to section line 2-2 of FIG. 1.
Figure 3:
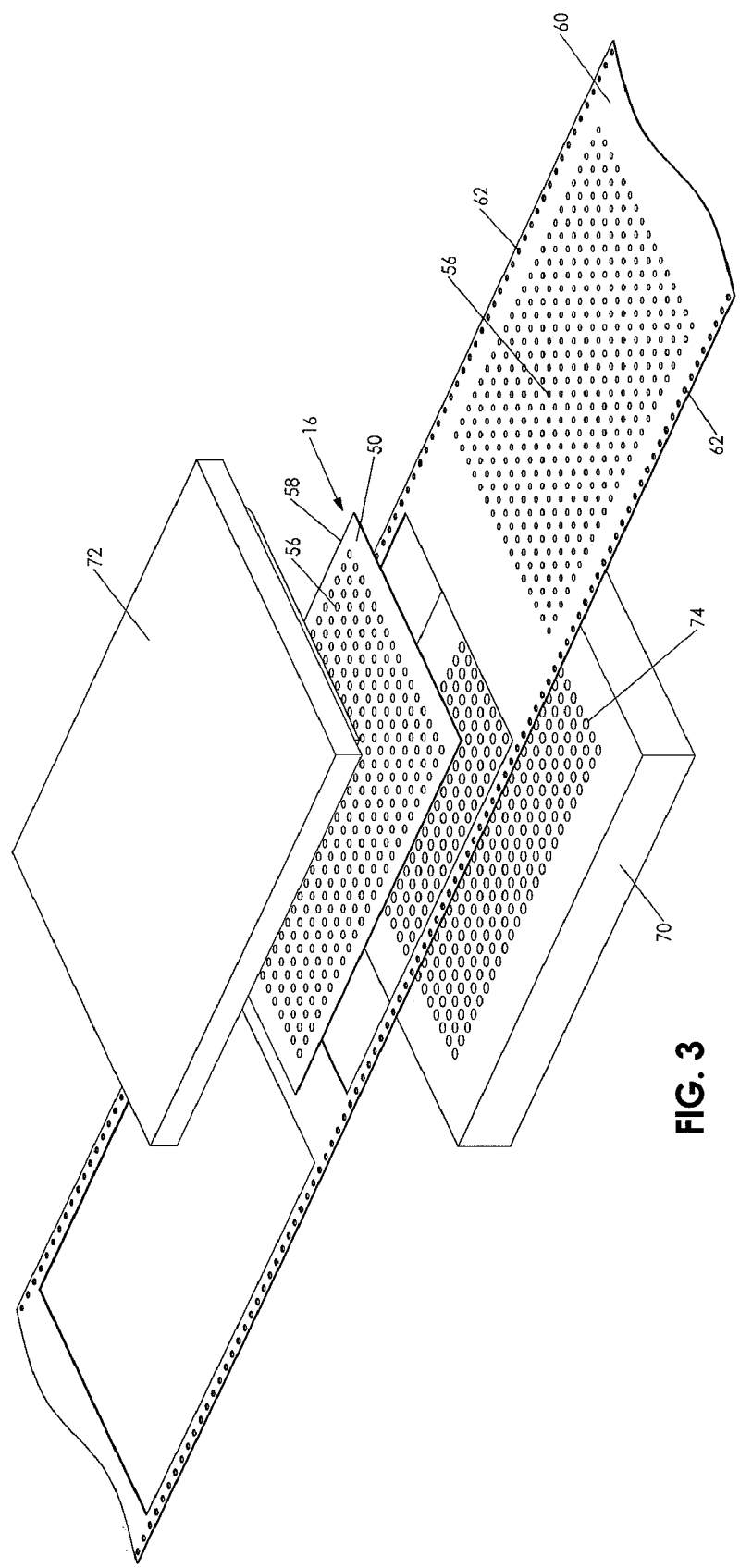
FIG. 3 shows an exploded perspective view of a flexible tape and a device for die cutting a tape piece from the flexible tape.
Figure 4:
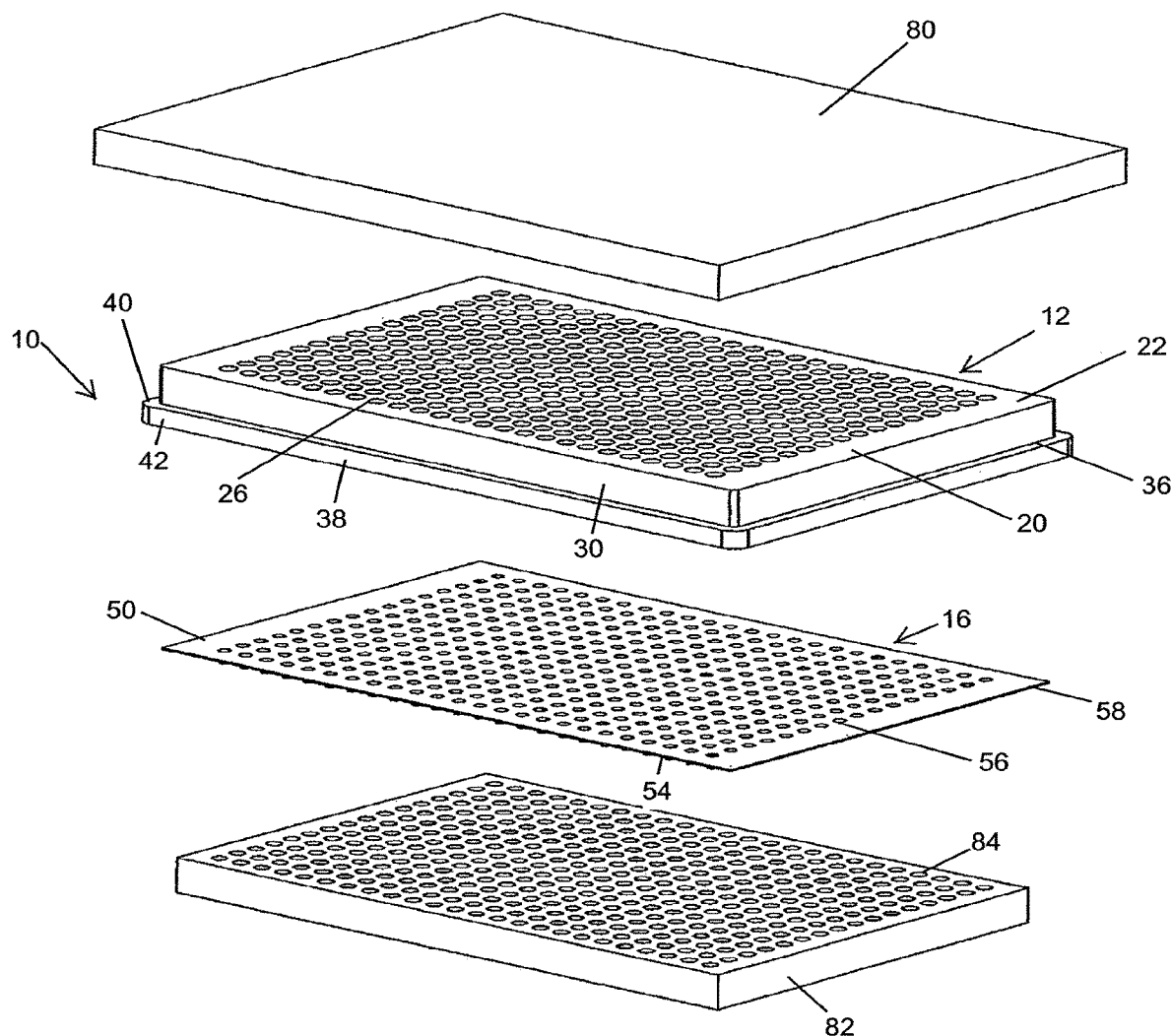
FIG. 4 shows an exploded perspective view of top and bottom pressing jaws for bonding the tape piece and a carrier to form the microplate of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "lower", "upper", "section", "longitudinal", "horizontal", "vertical", "annular", "spacing", "height", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A microplate according to the preferred teachings of the present invention is shown in the drawings and generally designated 10. According to the preferred form shown, microplate 10 includes a carrier 12 made of a rigid material to withstand robotic gripping and manipulation when utilized with a robotic device. Carrier 12 includes a plate 20 having top and bottom faces 22 and 24 spaced in a thickness direction defining a thickness which in the preferred form is sufficient to resist flexing. Plate 20 includes an array of holes 26 extending from top face 22 through bottom face 24. Carrier 12 further includes an annular perimeter wall 30 extending from plate 20 and extending in a direction perpendicular to top and bottom faces 22 and 24. Annular perimeter wall 30 includes an annular inner face 32. A recess 34 is defined by annular inner face 32 and bottom face 24 and precision formed for alignment purposes which will be explained further hereinafter. Annular perimeter wall 30 includes a lower edge 36 having a perimeter and a spacing to top face 22 larger than to bottom face 24. According to the most preferred form shown, carrier 12 further includes a lip 38 extending along the perimeter of lower edge 36 in the direction away from top face 22. Lip 38 includes a horizontal section 40 parallel to and spaced from top and bottom faces 22 and 24 in the thickness direction. Lip 38 further includes a vertical section 42 perpendicular to and spaced from top and bottom faces 22 and 24 in the thickness direction. Vertical section 42 is also spaced from top and bottom faces 22 and 24 in a horizontal direction perpendicular to the thickness direction. Lip 38 is utilized to allow stacking and nesting of microplates 10. It should be appreciated that annular perimeter wall 30 can have other shapes, forms and types according to the teachings of the present invention.

According to the preferred form shown, microplate 10 further includes a tape piece 16 made of an embossable, 6hermos-conductive, and low mass material. Tape piece 16 includes upper and lower surfaces 50 and 52 spaced in the thickness direction. Upper surface 50 of tape piece 16 is slideably bonded to bottom face 24 of plate 20 such as by a two-sided tape, 6hermos-bonding or adhesive. A thickness of tape piece 16 between upper and lower surfaces 50 and 52 in the thickness direction provides flexibility allowing rolling, with the thickness of plate 20 being multiple times the thickness of tape piece 16. Tape piece 16 further includes an array of wells 54 each extending in the thickness direction away from upper surface 50 and in the most preferred form from lower surface 52. Each well 54 has an opening 56 extending from upper surface 50 into the well 54 and aligned with one of the array of holes 26 of plate 20. The number and locations of the array of wells 54 of tape piece 16 correspond to those of the array of holes 26 of plate 20. Furthermore, the sizes of openings 56 of the array of wells 54 of tape piece 16 correspond to those of the array of holes 26 of plate 20. According to the preferred form shown, each well 54 has a clear flat bottom for assays requiring optical readout. However, the bottoms of the wells 54 can have other shapes including but not limited to a V shape with a rounded bottom. Wells 54 receive samples to be stored. These samples can be retrieved later for tests. Wells 54 can also receive reagents or other chemical compounds for desired tests. Each well 54 has a thin wall to allow rapid heat transfer to the sample received in well 54. Furthermore, tape piece 16 includes an annular outer periphery 58 extending between and perpendicular to upper and lower surfaces 50 and 52. Annular outer periphery 58 of tape piece 16 has a size corresponding to and in the most preferred foam slideably received in recess 34 of carrier 12. Specifically, annular outer periphery 58 of tape piece 16 is received in recess 34 of carrier 12 and abuts annular inner face 32 to align openings 56 of the array of wells 54 of tape piece 16 with the array of holes 26 of plate 20.

In a method for making the microplate according to the preferred teachings of the present invention, tape piece 16 is cut from a flexible tape 60 such as by but not limited to the type shown and described in U.S. Pat. Nos. 6,632,653 and/or 6,878,345. Specifically, flexible tape 60 is made of embossable, 7hermos-conductive, and low mass material and fed from a supply roll by a tractor drive. Flexible tape 60 includes a plurality of tractor feed holes 62 formed along two parallel, spaced, longitudinal edges thereof for coupling with sprockets of the tractor drive such that flexible tape 60 can be fed by rotating the sprockets to pass through a device for die cutting flexible tape 60. Flexible tape 60 includes a plurality of arrays of wells 54 spaced from one another along a longitudinal axis of flexible tape 60 perpendicular to the thickness direction. Each array of wells 54 is intermediate tractor feed holes 62 formed along parallel, spaced, longitudinal edges.

According to the preferred form shown, the device for die cutting flexible tape 60 includes an anvil 70 and a cutting die 72 located above and spaced from anvil 70 in a direction perpendicular to upper and lower surfaces 50 and 52 of flexible tape 60. Suitable provisions should be made to prevent damage to wells 54 of flexible tape 60 during cutting. In a preferred form when lower surface 52 abuts on anvil 70, anvil 70 includes an array of apertures 74 having a number and locations corresponding to array of wells 54 of tape piece 16. However, anvil 70 could include one or more cavities for receiving wells 54. Similarly, cutting die 72 could be annular shaped with upper surface 54 abutting on anvil 70. Other arrangement of die cutting can be utilized according to the teachings of the present invention. Flexible tape 60 is fed through a spacing between anvil 70 and cutting die 72. Flexible tape 60 is located upon anvil 70 with an array of wells 54 received in the array of apertures 74 of anvil 70 in the preferred form shown. Cutting die 72 is then moved in the direction perpendicular to upper and lower surfaces 50 and 52 of flexible tape 60 and against flexible tape 60. Thus, tape piece 16 is cut from flexible tape 60, and tape piece 16 can be removed by a worker or by a robotic device. After cutting die 72 is moved away from anvil 70, flexible tape 60 is fed until the next array of wells 54 on flexible tape 60 is aligned with the array of apertures 74 of anvil 70 for next die cutting. It should be appreciated that use of a tractor feed insures accurate placement of flexible tape 60 relative to anvil 70 and die 72 according to the preferred teachings of the present invention. Likewise, die cutting insures that annular outer periphery 58 of tape piece 16 is formed with square edges and is consistently and precisely positioned relative to the array of wells 54.

In the method for making microplate 10 according to the preferred teachings of the present invention, carrier 12 is formed separately from tape piece 16, and carrier 12 and tape piece 16 are bonded together by top and bottom pressing jaws 80 and 82 spaced in the thickness direction. According to the preferred form shown, bottom pressing jaw 82 includes an array of apertures 84 having a number and locations corresponding to the array of wells 54 of tape piece 16. Carrier 12 is placed onto upper pressing jaw 80 and suitably held in place such as by a vacuum. Tape piece 16 is placed upon lower pressing jaw 82 and suitably held in place such as by a vacuum with the array of wells 54 of tape piece 16 received in the array of apertures 84 of bottom pressing jaw 82, with openings 56 of the array of wells 54 of tape piece 16 aligned with the array of holes 26 of plate 20, and with annular outer periphery 58 of tape piece 16 aligned with annular inner face 32 of annular perimeter wall 30 of carrier 12. In a preferred form, adhesive is applied to upper face 50 of tape piece 16. Top pressing jaw 80 is moved relative to bottom pressing jaw 82 by moving one or both of top and bottom pressing jaws 80 and 82 in the thickness direction to sandwich upper surface 50 of tape piece 16 to bottom face 24 of plate 20 to ensure that the entire upper face 50 of tape piece 16 around openings 56 is bonded to bottom face 24 around the array of holes 26. Annular outer periphery 58 of tape piece 16 abuts with and slides along annular inner face 32 of annular perimeter wall 30 of carrier 12 while top pressing jaw 80 moves relative to bottom pressing jaw 82 until upper face 50 of tape piece 16 is bonded to bottom face 24 of plate 20. Top pressing jaw 80 is moved away from bottom pressing jaw 82 with tape piece 16 bonded to carrier 12 to form microplate 10. Microplate 10 is then removed by a worker or by a robotic device from between spaced top and bottom pressing jaws 80 and 82. It can be appreciated that a plurality of top pressing jaws 80 and/or a plurality of bottom pressing jaws 82 can be utilized and move around a closed loop between loading, pressing, and removal stations. In this regard, anvil 70 and pressing jaw 82 could be the same component utilized for different functions in different stations.

Now that the basic construction of microplate 10 of the preferred teachings of the present invention has been explained, the operation and some of the advantages of microplate 10 can be set forth and appreciated. When microplate 10 is subjected to heat transfer to heat or cool the samples in wells 54, the heat transfer rate is rapid for the whole outer periphery of each well 54 which can be in direct contact with the heating or cooling media and is not in any way partially blocked by carrier 12 according to the teachings of the present invention. Furthermore, adverse affect on wells 54 during heat transfer due to a varying temperature gradient moving down well 54 will not occur as can occur if the wells and samples are partially located within the carrier. Thus, the thermal mass of carrier 12 has significantly less affect on the samples and/or wells 54 according to the teachings of the present invention when tape piece 16 is essentially located beneath plate 20 of carrier 12. Additionally, samples can be read for the full height of wells 54 as wells 54 are located completely below plate 20 of carrier 12 according to the teachings of the present invention. These attributes are due to tape piece 16 being bonded to bottom face 24 of plate 20 of carrier 12 in microplate 10 according to the preferred teachings of the present invention so that upper ends of wells 54 are not blocked by carrier 12 during heat transfer.

Likewise, since tape piece 16 is bonded beneath carrier 12, a sealing strip can be applied directly to top face 22 of plate 20 of carrier 12 utilizing equipment and methods utilized for conventional, solid material trays or microplates. Due to carrier 12 being formed of rigid material and in particular of material more rigid than the material forming tape piece 16, a better seal can be obtained with microplate 10 according to the teachings of the present invention than can be obtained where the tape piece is partially located above the carrier used in prior multipiece microplates.

Microplate 10 according to the preferred teachings of the present invention can be utilized in many fields according to demands. As an example, microplate 10 according to the preferred teachings of the present invention can be utilized in solid material tray type machines. It can be appreciated that the method for making microplate 10 according to the preferred teachings of the present invention in affect can be utilized as a new way to manufacture a tray for automated equipment set up for conventional, solid material trays or microplates.

Now that the basic teachings of the present invention have been explained, many extensions and variations will be obvious to one having ordinary skill in the art. As an example, although the sizes of holes 26 of carrier 12 are shown as being slightly larger than openings 56 of tape piece 16 in the most preferred form, the relative sizes can be varied according to the preferred teachings of the present invention while still insuring that tape piece 16 is bonded to carrier 12 without sagging and that access to wells 54 is not detrimentally restricted. Likewise, although the number and shape of holes 26 of carrier 12 and openings 56 of wells 54 are shown as being the same in the preferred form shown, the number and/or shape can be varied according to the preferred teachings of the present invention while still insuring that tape piece 16 is bonded to carrier 12 without sagging and that access to wells 54 is not detrimentally restricted. Specifically, holes 26 of carrier 12 could be sized to correspond to more than one opening 56 and could have regular shapes such as circular, oval, rectangular, or figure 8 shapes or could have irregular shapes. Similarly, although holes 26 are shown in the preferred form as having the same shape, holes 26 could have differing shapes according to the preferred teachings of the present invention. Additionally, although the arrays of holes 26 and wells 54 are shown as formed in rows and columns of equal spacing, the arrays of holes 26 and wells 54 according to the teachings of the present invention could have different patterns than shown.

In other aspects, carrier 12 and tape piece 16 can be bonded together with other suitable methods and devices according to the teachings of the present invention. Flexible tape 60 can include a human readable identification number and/or a machine readable identification number such as a bar code for each array of wells 54 so that each tape piece 16 has at least one identification number. The identification numbers can be printed on flexible tape 60 using ink jet or other suitable methods. To assist in accurate and consistent placement of microplate 10 during automated phases of liquid sample handling procedures, annular perimeter wall 30 of carrier 12 can include notches or the like for coupling with a coupling mechanism of automated handling equipment including but not limited to a robotic arm.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A microplate comprising, in combination:
   a carrier including a plate having a top face, a bottom face spaced from the top face in a first direction, and an array of holes extending from the top face; and
   a tape piece including an upper surface and a lower surface spaced a thickness from the upper surface in the first direction, with the tape piece further including an array of wells each integrally extending in the first direction away from the upper and lower surfaces and each having an opening extending from the upper surface into the well and an integral bottom spaced from the opening, with the array of wells having a number and locations corresponding to the array of holes of the plate, with the upper surface bonded to-the bottom face of the plate, with the openings of the array of wells corresponding to the array of holes of the plate, with the carrier formed of material more rigid than material forming the tape piece;
   wherein the tape piece further includes an annular outer periphery extending between and perpendicular to the upper and lower surfaces, and
   wherein the carrier further includes an annular perimeter wall extending from the plate in a direction perpendicular to the top and bottom faces, with the annular perimeter wall including an annular inner face defining a recess of the carrier with the bottom face of the plate, with the annular inner face abutting the annular outer periphery of the tape piece.

2. The microplate as claimed in claim 1, with the annular perimeter wall including a lower edge having a perimeter and a spacing to the top face larger than to the bottom face, with the carrier further including a lip extending along the perimeter of the lower edge, with the lip including a first section parallel to and spaced from the top and bottom faces in the first direction, with the lip further including a second section perpendicular to and spaced from the top and bottom faces in the first direction, and with the second-section being spaced from the top and bottom faces in a second direction perpendicular to the first direction.

3. The microplate as claimed in claim 2, with the tape piece having a thickness between the upper and lower surfaces providing flexibility to allow rolling, with the plate having a thickness between the top and bottom faces sufficient to resist flexing.

* * * * *

UNITED STATES PATENT AND TRADEMARK OFFICE
CERTIFICATE OF CORRECTION

PATENT NO. : 11,548,005 B2
APPLICATION NO. : 16/242884
DATED : January 10, 2023
INVENTOR(S) : Bruce Malcolm Peterson It is certified that error appears in the above-identified patent and that said Letters Patent is hereby corrected as shown below:

In the Specification

In Column 2, Line 23, delete "3hermos-conductive" and insert -- thermo-conductive --

In Column 2, Line 47, delete "3hermos-bonding" and insert -- thermo-bonding --

In Column 4, Line 25, delete "6hermos-conductive" and insert -- thermo-conductive --

In Column 4, Line 29, delete "6hermos-bonding" and insert -- thermo-bonding --

In Column 4, Line 66, delete "7hermos-conductive" and insert -- thermo-conductive --

In Column 4, Line 55, delete "foam" and insert -- form --

In the Claims

Claim 1, in Column 8, Line 14, delete "to-the" and insert -- to the --

Claim 2, in Column 8, Line 37, delete "second-section being" and insert -- second section being --

Signed and Sealed this
Thirteenth Day of June, 2023

Katherine Kelly Vidal
*Director of the United States Patent and Trademark Office*